3,295,061
MEASURING SYSTEM HAVING CONDITION RESPONSIVE MEANS WHEREIN MEASURED AND REFERENCE AMPLITUDE VARYING SIGNALS ARE CONVERTED TO PROPORTIONAL PHASE DISPLACED SIGNALS
Thomas F. O'Hare, New York, N.Y., assignor to The Bendix Corporation, Teterboro, N.J., a corporation of Delaware
Filed Dec. 20, 1962, Ser. No. 246,262
8 Claims. (Cl. 324—140)

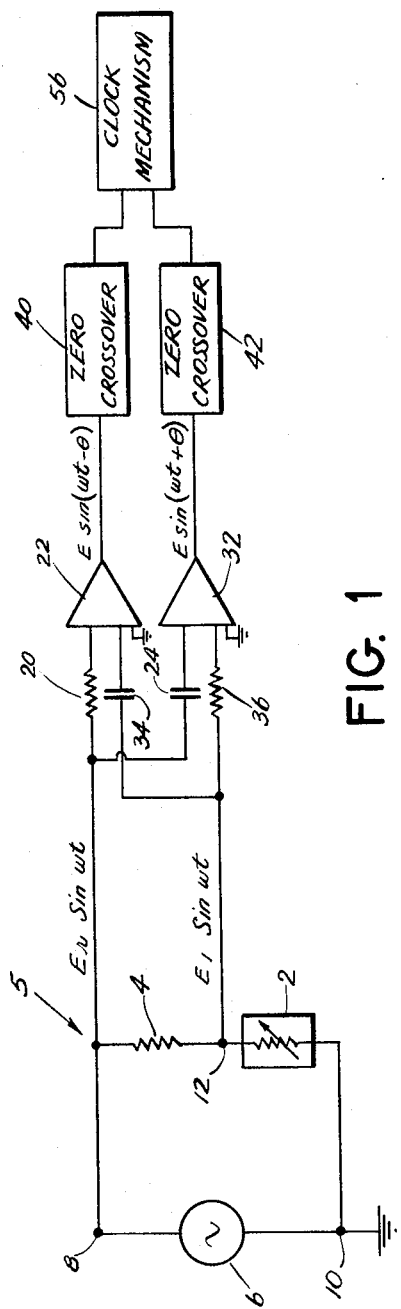
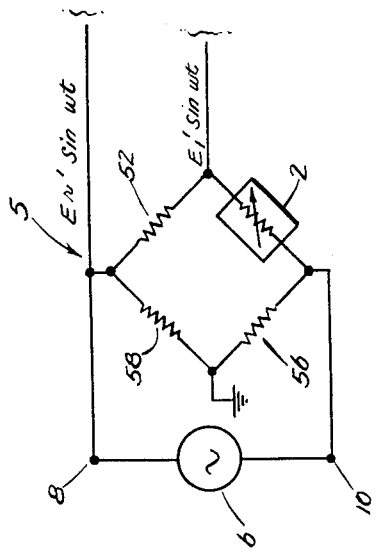
FIG. 1
FIG. 2
INVENTOR.
THOMAS F. O'HARE
BY Roland Plottel
ATTORNEY

United States Patent Office 3,295,061
Patented Dec. 27, 1966

The invention relates generally to analog to digital converters and in particular to resistive analog converters for use in a phase shift type analog to digital converter.

One type of analog to digital converter that is presently available and widely used employs the operating principle of a "phase shift encoder" and uses time as an intermediary analog signal. In this type of conversion, a sinusoidal reference signal is applied to a resolver, synchro, or other such electromechanical device whose rotor is displaced in accordance with an input analog mechanical rotation to provide two output signals whose amplitudes vary in accordance with the sine and cosine of the angle of rotation imparted to the rotor of the resolver, synchro, or other such electromechanical device. The output signals are applied to a phase shifter that converts the amplitude varying output signals to a phase displaced signal having a phase angle displacement proportional to the amplitude of the signals which is proportional to the angular displacement of the rotor of the resolver, synchro, or other such electromechanical device. The zero crossing of the reference signal and the phase shifted signal are both detected. When a zero crossing of the reference signal occurs, a gate circuit is opened and fixed frequency clock pulses are admitted to a counter. When a zero crossing of the phase shifted signal occurs, the gate is closed and no more signals enter the counter. The number of signals that entered the counter is then a measurement of the phase shift which is proportional to the mechanical rotation imparted to the resolver, synchro, or other such electromechanical device.

The phase shifter is often frequency sensitive, and to compensate for frequency variations of the reference signal, two phase shifters may be connected in parallel providing equal amplitude but opposite sense phase shift and a minimum net frequency distortion. An analog to digital converter of the phase shift encoder type using an electromechanical resolver and two parallel phase shifters to provide frequency compensation, is shown and described in Kronacher U.S. Patent No. 2,894,256.

The phase shift encoder type of analog to digital conversion has been well developed and is extremely popular. Its logical and direct use is with analog input signals which are in the form of a mechanical rotation. However, because of its popularity, other types of analog input signals, such as pressure or temperature, are first converted to a mechanical rotation which is then applied to the resolver, synchro, or other such input electromechanical device.

The above type electromechanical input, phase shift encoder has been analyzed in standard books, such as Susskind, Notes on Analog-Digital Conversion Techniques, New York, Wiley, (1956), cf. pages 6–8 ff.

A chief limitation on the accuracy of the electromechanical input phase shift encoder is due to the resolver, synchro, or other such electromechanical device. Errors are introduced by the inherent inaccuracies in the resolvers, synchros, etc. which include a generated quadrature voltage, and phase distortions which are functions of temperature variations. Furthermore, the synchro, resolver, and other such electromechanical devices have leakage, inductances, and stray capacitances, which, in general, depend upon shaft position, thus produce a nonlinearity, which is often summed up and expressed as angular error. Moreover, methods of construction such as: the number of poles on the stator and rotor, whether or not the slots are diagonal, uniformity of the stator to rotor air gap, the method in which the coils are wound and the degree to which they are matched, the degree of magnetic isotropy of the iron, all affect the accuracy of the resolver, synchro, or other such electromechanical device. Furthermore, when the rotor is turned to null output, there are residual components left that cannot be completely eliminated. These are introduced by electrostatic coupling and consist of harmonics and a fundamental component in quadrature with the exciting voltage. The harmonics may be removed by filtering but the quadrature component is still burdensome.

Various attempts have been made to increase the overall accuracy of phase shift encoders, such as construction of more accurate resolvers, synchros, and electromechanical devices and the introduction of filters to block harmonics. Heretofore, attempts to remove quadrature have generally been unsuccessful, although claims have been made to this effect. Heretofore, attempts to remove phase distortions due to temperature have generally been unsuccessful, although claims have also been made to this effect. The present invention, however, involves a distinctly different approach.

It is believed that the resolver, synchro, or other such electromechanical device introduces too great an inaccuracy into the analog to digital conversion; and therefore, it is an object of the present invention to do away with the resolver, synchro, or other such electromechanical inputs entirely.

The invention centers on the use of a resistive input circuit and finds greatest application when the analog input signal is in the form of change in resistance. The invention may be contrasted with the procedure heretofore used. Formerly, the analog changes in resistance input from, for example, a temperature probe, or a strain gauge would first be converted to a mechanical rotation which was applied to a resolver, synchro, or other such electromechanical device. The present invention converts the analog resistive signal directly to a phase displaced signal without the intermediary resolver, synchro, or other such electromechanical device, thereby removing the inaccuracies inherent in such resolvers, synchros, or other such electromechanical devices.

The invention is further applicable to mechanical analog inputs since mechanical analog input signals can be transduced into varying resistances through the use of a mechanical linkage to drive a potentiometer. Likewise, the invention is applicable to any analog input signal that can be converted into a corresponding change in resistance.

An object of the invention is to provide an improved and more accurate phase shift encoder analog to digital converter by using a resistive input.

Another object of the invention is to provide a novel circuit for converting resistance to a digital number.

Another object of the invention is to provide a novel circuit for converting change in temperature as measured by a temperature probe to a digital number.

The invention contemplates a circuit for converting a change in a quantity expressable as a change in resistance to a change in phase angle, and comprises a variable resistor whose resistance changes in accordance with the quantity connected, at least, in series with at least one fixed resistor. A source of voltage is connected across the two resistors providing at the junction of the two resistors a divided voltage that varies in accordance with variations of the quantity. A phase shifter is connected to a junction of the source with resistor, and to a junction of the two resistors for receiving respectively a fixed amplitude voltage and the divided voltage to provide a signal whose phase angle varies in accordance with variations of the quantity.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 1 is a variable resistance to phase shift and to digital converter constructed in accordance with the invention.

FIGURE 2 is an alternative embodiment of the resistive input part of the circuit of FIGURE 1.

Referring to the drawing of FIGURE 1, there is shown a temperature probe 2 whose resistance varies in accordance with its ambient temperature. Probe 2 is connected in series with a divider resistor 4 to form a resistive input circuit 5 connected across a source of alternating reference voltage 6, from terminal 8 to ground 10. Source 6 provides at terminal 8 a reference voltage $E_r \sin wt$, and provides a divided voltage $E_1 \sin wt$ at a junction 12 of probe 2 with resistor 4. Amplitude $E_1$ is equal to the amplitude of $E_r$ times the ratio of the resistance of probe 2 divided by the sum of the resistances of resistor 4 and probe 2.

The reference voltage on terminal 8 is applied through a resistor 20 to a summing amplifier 22 and through a capacitor 24 to a second summing amplifier 32. The divided voltage at terminal 12 is applied through a capacitor 34 to the summing amplifier 22, and through a resistor 36 to the summing amplifier 32. The summing amplifiers 22 and 32 provide respectively an output signal $E \sin (wt-\theta)$ and $E \sin (wt+\theta)$ where phase angle $\theta$ is proportional to the relative amplted of the divided voltage to the reference voltage. The output from amplifier 22 is phase displaced in one sense $-\theta$ and the output from amplifier 32 is phase displaced in the opposite sense $+\theta$ from the reference voltage, and the amount of phase displacement between the outputs of the two amplifiers 22 and 23 varies in accordance with the relative amplitude of $E_1$ to $E_r$, which in turn is controlled by the temperature sensed by probe 2.

The signals from amplifiers 22 and 32 are applied to zero crossover detector circuits 40 and 42 respectively which provide pulses coincident with the positive zero crossings of the applied signals. The zero crossover detectors 40 and 42 are connected to a clock mechanism 56 which may be of any convenient or conventional type. One type of clock mechanism employs a constantly running high frequency pulse generator. A pulse from one zero crossover detector, for example, 40, opens a gate in the clock mechanism which enables pulses to pass from the generator into a counter for recording. A pulse from the other zero crossover detector 42 closes the gate blocking subsequent pulses from the generator to the counter. The phase angle difference between the two signals $\theta$ is proportional to the temperature applied to probe 2 and is readily computed from the frequency of the pulse generator, the number of pulses counted into the counter, and the frequency of the reference signal.

The resistive input circuit 5 of FIGURE 1 is shown in a so-called dual phase shaft conversion type circuit described in Kronacher U.S. Patent No. 2,894,256 referred to above. It will be noticed that the phase shaft provided by resistor 20 and capacitor 34 is frequency sensitive. To compensate for phase variations due to frequency variations of the reference signal from source 6, a second or dual channel, comprising the phase shifter circuit having capacitor 24 and resistor 36, is included. The two phase shifter circuits vary in a like manner thus minimizing any phase variations due to frequency variations.

It has been claimed that the use of dual phase shift circuits with an input resolver will compensate for the resolver temperature sensitive phase distortions and for quadrature voltages introduced by the resolver. While the dual circuit may, to some extent, compensate these factors, it does not remove them. By the use of a resistive input in place of a resolver, the errors introduced by the resolver are completely avoided.

Furthermore, the resistive input circuit is insensitive to amplitude variations of source 6, since the ratio of the divided voltage to the reference voltage is constant for variations of the source voltage. It is the ratio of the two voltages that determines the phase shift output from the amplifier, and thus the system is amplitude insensitive.

Referring now to FIGURE 2, there is shown an alternative embodiment of the divider circuits of FIGURE 1. Like elements in both of the FIGURES bear like legends. Resistive probe 2 is connected between resistors 52 and 56 which are joined together by a resistor 58 to form a bridge configuration resistive input circuit 5'. The source of potential 6 is connected across the bridge from the junction of resistors 52 and 58, to the junction of probe 2 with resistor 56. Note, however, that the source 6 is not grounded at terminal 10. The bridge is grounded at a junction of resistors 58 and 56, and an output divided voltage $E_1' \sin wt$ is taken at the junction of probe 2 with resistor 52. The reference voltage is taken across resistor 58 and is equal $E_r' \sin wt$, where $E_r'$ is of constant amplitude, an equal to the resistance of resistor 58 divided by the sum of the resistances of resistors 58 and 56 times the amplitude of the voltage provided by source 6.

The advantages of using a bridge divider circuit are better accuracy and better sensitivity than obtainable with the single divider. This is apparent from consideration of the temperature probe 2. The probe 2, for example, measures temperature in the range of $-55°$ C. to $+125°$ C. with a corresponding resistance change of 50 ohms to 100 ohms. The resistors 52, 56, and 58 are selected, for example, such that the resistance of resistors 52 and 58 are equal, and the resistance of resistor 56 is equal to the resistance of the probe 2 at one of its measuring limits, i.e. resistance of resistor 56 is equal to either 50 ohms or 100 ohms.

Assume resistor 56 has 50 ohms resistance, then, when the temperature sensed by the probe is $-55°$ C., the bridge is balanced and the amplitude of $E_1' \sin wt$ is zero. As the temperature increases, the bridge becomes unbalanced and the amplitude of $E_1' \sin wt$ increases. When the temperature sensed by the probe is the lower limit measurable by the probe, there is a 90° phase difference between the output signals from the summing amplifiers, and as the temperature increases from the lower limit, there is a corresponding phase change until a maximum is reached.

The values of the resistors in the legs may be adjusted as desired and the one-to-one relation set forth above is not essential to the invention. A 90° phase shift is obtained for null output from the bridge, namely when the ratio of the resistance of probe 2 at null divided by this resistance plus the resistance of resistor 52 is equal to the ratio of the resistance of resistor 56 divided by the sum of the resistance of resistors 56 and 58.

The values of resistors 52, 56, and 58 can be further selected to provide a divided voltage $E_r' \sin wt$ which is nonlinearly related to changes in resistance of the probe 2, to compensate for any nonlinearity of the probe 2, or to provide functions of the change in resistance in accordance with Van Winkle, U.S. application Ser. No. 136,498, entitled, Analog Computer, assigned to the same assignee as the present application.

Two examples have been given of resistive inputs (a voltage divider and a bridge divider) used in phase shift encoder analog to digital converter. Other types of resistive divider inputs may be used so long as the divided voltage $E_1 \sin wt$ is proportional to the change in resistance, or the difference between $E_r$ and $E_1$ is proportional to the change in resistance.

The resistive input circuit may be used with any type of phase shift encoder adapted to receive two signals and provide a phase angle displacement proportional to the amplitude of the signals.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a circuit of the kind adapted to receive two voltages which differ in amplitude but which have substantially the same frequency and phase, a first phase shifting circuit for receiving the voltages and for producing an output signal which is shifted in phase in one sense with respect to the phase of said two voltages in accordance with the ratio of the amplitudes of said voltages, a second phase shifting circuit adapted to receive the voltages for producing an output signal which is shifted in phase in the opposite sense with respect to the phase of said two signals in accordance with the ratio of the amplitudes of said two voltages, detection means for producing pulses when the signals from the two phase shifters pass through a predetermined amplitude in a predetermined sense, and means for measuring the elapsed time between the occurrence of pulses derived from said two phase shifting circuits, the improvement being a resistive input circuit for providing the two voltages comprising a source of reference voltage, an element which changes resistance in accordance with changes of a variable, at least one resistor connected in series with the element and said series combination being connected across the source providing at the junction of the source and resistor a fixed voltage proportional to the voltage of the source, and at the junction of the resistor with the element a divided voltage which varies in accordance with changes of the variable.

2. A circuit for measuring temperature comprising a temperature probe whose resistance changes in accordance with changes in temperature, a source of reference voltage, a fixed resistor connected in series with the temperature probe across the source and providing at a junction of the resistor and probe a divided voltage which varies in accordance with changes in the resistance of the probe, phase shifting circuits connected to a terminal of the source and to the junction of the resistor and the probe for receiving respectively the reference voltage and the divided voltage to provide signals whose phase angles vary in opposite senses from the reference voltage and divided voltage in accordance with the amplitude difference between the voltages, detection means connected to the phase shifting circuits for producing pulses corresponding respectively to the instants at which the signals from the phase shifting circuits pass through a predetermined amplitude in a predetermined sense, and means connected to the detection means for measuring the elapsed time between the occurrence of pulses to provide a measurement proportional to the temperature.

3. A circuit for converting a quantity expressable as a resistance to a digital measurement, comprising a source of reference voltage, a fixed resistor and a variable resistor, whose resistance changes in accordance with the quantity, connected in series and across the source so as to provide at a junction of the two resistors a divided voltage which varies in accordance with changes in the resistance of the variable resistor, phase shifting circuits connected to a terminal of the source and to the junction of the two resistors for receiving the reference voltage and the divided voltage to provide signals whose phase angles vary in opposite senses from the reference voltage and divided voltage in accordance with the amplitude difference between the voltages, detection means connected to the phase shifting circuits for producing pulses corresponding respectively to the instants at which the signals from the phase shifting circuits pass through a predetermined amplitude in a predetermined sense, and means connected to the detection means for measuring the elapsed time between the occurrence of pulses to provide a digital measurement proportional to the quantity.

4. A circuit for measuring a quantity expressable as a resistance, comprising a bridge having fixed resistors in three legs and a variable resistor in the remaining leg which changes resistance in accordance with the quantity, a source of voltage connected across opposite terminals of the bridge, a reference potential connected to one of the remaining two terminals to provide at the other remaining terminal a divided voltage which varies in accordance with the resistance of the variable resistor, and phase shifting circuits connected to the reference potential and to the source and to the other remaining terminal for receiving respectively thereat a fixed amplitude voltage and the divided voltage to provide signals whose phase angles vary in opposite senses from the fixed amplitude voltage and divided voltage in accordance with the amplitude difference between these two voltages, detection means connected to the phase shifting circuits for producing pulses when the signals from the phase shifting circuits pass through a predetermined amplitude in a predetermined sense, and means connected to the detection means for providing an output corresponding to the interval between the pulses to measure the quantity.

5. In the circuit of the kind defined in claim 4, the fixed resistor in the bridge being selected to provide a zero divided voltage for a predetermined amount of resistance of the variable resistor.

6. A circuit for measuring temperature comprising a bridge having fixed resistors in three legs and a temperature probe in a fourth leg, a reference potential connected to a first terminal of the bridge, a source of voltage connected across second and third opposite terminals of the bridge and providing at a fourth terminal a divided voltage which varies in accordance with the temperature applied to the probe, phase shifting circuits connected to the reference potential and to the second terminal and to the fourth terminal for receiving respectively thereat a fixed amplitude voltage and the divided voltage to provide signals whose phase angles vary in opposite senses from the fixed amplitude voltage and the divided voltage in accordance with the relative amplitudes of these two voltages, detection means connected to the phase shifting circuits for producing pulses when the signals from the phase shifting circuits pass through a predetermined amplitude in a predetermined sense, and means connected to the detection means for measuring the elapsed time between the occurrence of pulses to measure the temperature.

7. A resistive input phase shift encoder comprising a source of reference voltage, an element which changes resistance in accordance with changes of a variable, at least one resistor connected in series with the element and across the source and providing at the junction of the source with a resistor a fixed amplitude voltage and at the junction of the resistor with the element a voltage which varies in accordance with changes of the variable, phase shifting circuits connected to the element and resistor for receiving the voltages and producing output signals shifted in phase in opposite senses with respect to the phase of said two voltages in accordance with the relative amplitudes of the voltages, detection means connected to the phase shifting circuit for producing pulses when the signals from the phase shifting circuits pass through a predetermined amplitude in a predetermined sense, and means connected to the detection means for measuring the interval between pulses to measure the variable.

8. A circuit for measuring a quantity expressable as a resistance, comprising at least one fixed resistor and a variable resiston whose resistance changes in occordance with the quantity connected in series, a source of voltage connected across the two resistors and providing at a junction of the two resistors a divided voltage which varies in accordance with variations of the quantity, phase shifting circuits connected to a junction of the source with the resistor and to the junction of the two resistors for receiving respectively a fixed amplitude voltage and the divided voltage to provide signals whose phase angles vary in opposite senses from the fixed amplitude voltage and the divided voltage in accordance with variations of the quantity, detection means connected to the phase shifting circuits for producing pulses when the signals from the phase shifting circuits pass through a predetermined amplitude in a predetermined sense, and means connected to the detection means for measuring the interval between the occurrence of pulses to measure the variable.

References Cited by the Examiner

UNITED STATES PATENTS

| | | | |
|---|---|---|---|
| 2,852,743 | 7/1954 | Pappas | 324—140 |
| 3,025,466 | 3/1962 | Beers | 324—62 |
| 3,039,050 | 6/1962 | Krohn | 324—57 |
| 3,230,449 | 1/1966 | Kaiser | 324—57 X |

RUDOLPH V. ROLINEC, *Primary Examiner.*

G. L. LETT, J. J. MULROONEY, *Assistant Examiners.*